United States Patent [19]

Takata

[11] E Patent Number: Re. 32,500

[45] Reissued Date of Patent: Sep. 15, 1987

[54] BUTTON HAVING PLASTIC RESIN HEAD

[75] Inventor: Akihiko Takata, Fujisawa, Japan

[73] Assignee: Scovill Japan Kabushiki Kaisha, Tokyo, Japan

[21] Appl. No.: 897,173

[22] Filed: Aug. 15, 1986

Related U.S. Patent Documents

Reissue of:

[64] Patent No.: 4,580,320
Issued: Apr. 8, 1986
Appl. No.: 593,345
Filed: Mar. 26, 1984

[30] Foreign Application Priority Data

May 9, 1983 [JP] Japan ..... 58-67842[U]

[51] Int. Cl.[4] ..... A44B 1/12

[52] U.S. Cl. ..... 24/113 MP; 24/113 R; 24/90 A; 24/90 HA

[58] Field of Search ..... 24/113 R, 113 MP, 90 A, 24/90 HA, 92, 94, 460, 461, 462, 265 C, 453

[56] References Cited

U.S. PATENT DOCUMENTS

| | | | |
|---|---|---|---|
| 2,099,979 | 11/1937 | Bangs | 24/113 MP |
| 2,214,030 | 9/1940 | Pereles | 24/90 A |
| 2,470,963 | 5/1949 | Weyl | 24/90 HA |
| 2,582,383 | 1/1952 | Jones | 24/113 MP |
| 3,087,215 | 4/1963 | Tworek et al. | 24/113 R |
| 3,206,818 | 9/1965 | Knowlton | 24/90 HA |
| 3,214,811 | 11/1965 | Adinolfi | 24/113 R |
| 3,457,601 | 7/1969 | Prym | 24/113 R |
| 3,543,354 | 12/1970 | Schuchman, Jr. et al. | 24/113 R |
| 3,648,331 | 3/1972 | Kruger et al. | 24/113 R |
| 4,283,815 | 8/1981 | Henshaw | 24/90 A |

FOREIGN PATENT DOCUMENTS

| | | | |
|---|---|---|---|
| 95221 | 6/1922 | Switzerland | 24/90 A |
| 537766 | 7/1941 | United Kingdom . | |
| 692566 | 6/1953 | United Kingdom | 24/113 R |
| 785730 | 11/1957 | United Kingdom . | |
| 893394 | 4/1962 | United Kingdom . | |

*Primary Examiner*—Victor N. Sakran
*Attorney, Agent, or Firm*—Panitch, Schwarze, Jacobs et al.

[57] ABSTRACT

A button comprising a button head of plastic resin formed with a cavity having an internally expanded portion, and a metallic leg piece including a generally disc-shaped base larger in diameter than the inlet of the cavity and at least one leg upstanding from the disc-shaped base, said base being fitted in the internally expanded portion through the narrow inlet of the cavity.

12 Claims, 14 Drawing Figures

BUTTON HAVING PLASTIC RESIN HEAD

Matter enclosed in heavy brackets [ ] appears in the original patent but forms no part of this reissue specification; matter printed in italics indicates the additions made by reissue.

This invention relates to improvements in a button comprising a plastics head and a metallic leg or legs.

BACKGROUND OF THE INVENTION

Buttons with plastics heads are in extensive use for ornamental effects of the head designs as well as for fastening purposes. Of these buttons, some types are known which combine a plastics head with a metallic leg piece. Varied means for joining the head and the leg piece are available according to the kinds of the plastics, but none of them thus far provided have proved fully satisfactory.

FIGS. 1 to 3 illustrate an example of the prior art using a thermosetting resin. A metallic leg piece as shown in FIGS. 1 and 2, which consists of an annular base 1 having upright legs (in this case, prongs with pointed tips) 2 with which the button is to be secured to a garment, is placed, together with a thermosetting resin, into a mold 3 and jointed integrally by thermally setting the resin to form a button head 4. In order that the leg piece can be securely embedded in the plastics head, its base 1 is annularly shaped to permit the resin to cover it completely. The button head of thermosetting resin is so hard that it is rarely scratched and permits sophisticated designs. When the button head 4 is placed in the cavity of a fitting die for attachment to a garment and a sufficient pressure for attachment is applied to the legs 2, localized forces will be exerted on the annular base 1 and hence on the button head 4, often causing cracks in the head and making the button defective. Indirectly responsible for the cracking are internal stresses that arise from the difference in thermal shrinkage coefficients between the button head and the leg piece upon the thermosetting treatment and cooling. FIGS. 4 and 5 show another conventional button which uses a rigid thermoplastic resin. A leg (in this instance a tubular stem) having a conically flaring end is inserted into a button head 6 having a recess 5 with a correspondingly spread botton. The leg is pressed in the direction of the arrow to expand the conical end so that, as shown in FIG. 5, the flaring end is flattened solidly against the spread bottom of the recess 5 to form a button. For this application a thermoplastic resin is usually used because a button head of a thermosetting resin tends to crack unless the dimensions are strictly controlled to exacting tolerance. However, a thermoplastic resin button head is not aethetically attractive, is easy to scratch or damage, and lacks resistance to heat and chemicals. FIGS. 6 and 7 illustrate a further conventional button which consists of a leg piece 11 fitted at its base flange into a recess 8 surrounded by a circular ridge 9 of a button head 10 of a rigid thermoplastic resin (FIG. 6), with the ridge 9 crimped flat against the flange (FIG. 7). The button head of this design can be made solely of a thermoplastic resin as the ridge 9 is deformed.

OBJECT OF THE INVENTION

The object of the present invention is, therefore, to provide a button which has a rigid plastic button head free of cracking, resistive against scratch, damage, heat and chemicals and aesthetically attractive.

SUMMARY OF THE INVENTION

Briefly, the button according to the invention is characterized in that it comprises a button head of thermally set polyester resin having an internally expanded cavity, and a metallic leg piece including a generally disc-shaped base with a diameter larger than the diameter of the inlet of the cavity and at least one leg upstanding from the base, the disc-shaped base being fitted through the narrow inlet into the expanded cavity. The construction defined above enables the button to have a thermally set resin head which retains the desirable properities of the thermosetting resin. In addition, the base of the leg piece, being disc-shaped, disperses the pressure that is applied when the piece is attached to a garment, thus preventing cracking of the button head despite the fact that the latter is made of a thermally set resin. Preferably the cavity or the recess of the button head has a curved bottom and the disk-shaped base has also a complementary curved bottom. These bottons act together to uniformly disperse the force applied when the buttom is attached to a garment.

DETAILED EXPLANATION OF INVENTION

Figure 1:
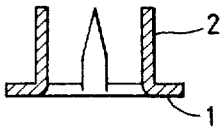
FIG. 1 PRIOR ART
FIG. 1 is a front sectional view of a leg piece of a conventional button.
Figure 3:
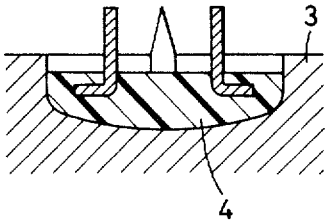
FIG. 3 PRIOR ART
FIG. 3 is a front sectional view of the button showing how the button head is fitted to the leg piece.
Figure 2:
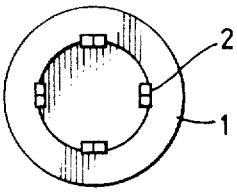
FIG. 2 PRIOR ART
FIG. 2 is a plan view of the leg piece.
Figure 4:
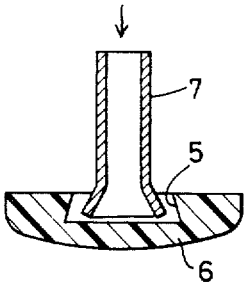
FIG. 4 PRIOR ART
FIG. 4 is a front sectional view of another button of the prior art.
Figure 5:
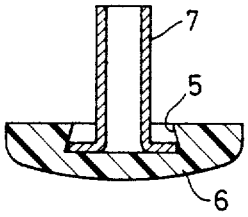
FIG. 5 PRIOR ART
FIG. 5 is a sectional view of the button in FIG. 4 as assembled.
Figure 6:
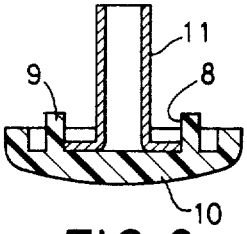
FIG. 6 PRIOR ART
FIG. 6 is a front sectional view of yet another button of the prior art.
Figure 7:
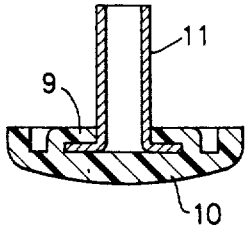
FIG. 7 PRIOR ART
FIG. 7 is a sectional view of the button as assembled.
Figure 8:
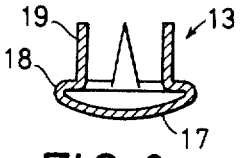
FIG. 8 is a front sectional view of the leg piece of a button embodying the invention.
Figure 9:
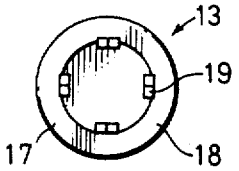
FIG. 9 is a plan view of the leg piece.
Figure 10:
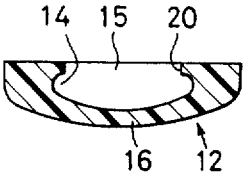
FIG. 10 is a sectional view of the button head of the button according to the invention.
Figure 11:
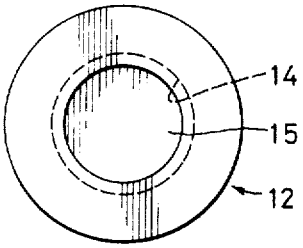
FIG. 11 is a plan view of the button head.

The present invention will now be explained in detail with reference to the accompanying drawings which illustrate preferred embodiments of the invention.

FIGS. 8 through 12 show a button embodying the invention as comprising a button head 12 and a leg piece 13 with which the button is to be secured in place. The button head 12 is made of a thermosetting polyester resin and has an ornamental face on the front side and a circular cavity 15 narrow at the inlet but internally expanded as at 14 on the rear side. The button head 12 is preformed before uniting with the leg piece 13. The leg piece 13 consists of a generally circular base 17 of substantially the same contour as the bottom of the cavity 15 in the button head 12, and a plurality of legs 19 upstanding from points radially inside of the periphery 18 of the base 17. An important feature of the leg piece 13 is that the base 17 is circular, not annular, in shape so as to avoid any stress concentration at the time the piece is attached to the garment. Preferably, the bottoms of the base 17 of the leg piece 13 and the cavity 15 of the button head are complementary rounded to uniformly dispense the stress when the button attached a garment. The dimensional relation between the diameter of the base 17 of the leg piece 13 and the diameter of the inlet 20 of the cavity 15 of the button head 12 is such that the diametral difference is fairly large provided it does not hamper the fitting of the base into the cavity 15. This relation can be experimentally determined with ease. The internally expanded portion 14 of the cavity 15 of the button head 12 is designed to have substantially the same diameter as, or be larger than, the base 17 of the leg piece 13.

The button head 12 and the leg piece 13 of the structures described above are joined together in the following way. The head 12 is held in the cavity of a die having a supporting surface complementary or corresponding to the head surface 16. The head is then heated to a temperature at which the polyester resin softens slightly, e.g., about 50° C., and the base 17 of the leg piece is snapped into the cavity 15 of the head. In this manner the button head of polyester resin can be readily united with the leg piece without the danger of cracking.

When securing the button thus assembled to a garment, the force applied for its fitting is distributed over a broad area of engagement between the base 17 of the leg piece 13 and the cavity 15 of the button head 12. This eliminates the cracking problem despite the use of the thermosetting resin. On the other hand, the button takes the advantage of polyester resin's excellent appearance and feeling, rigidity, and resistance to heat and chemicals well comparable to those of natural stones, tortoiseshell, and the like.

Figure 13:
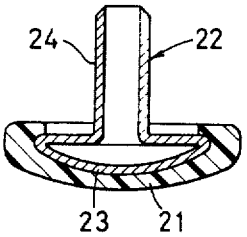
FIGS. 13 and 14 is a front sectional view of another embodiment of the button of the invention.
Figure 12:
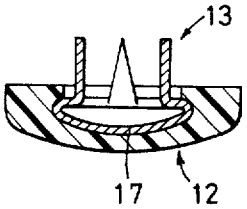
FIG. 12 is a front sectional view of the button.

FIG. 13 presents another embodiment of the invention, in which 21 is a button head of thermoset polyester resin and 22 is a leg piece having a flat disc-shaped base 23 and a tubular leg 24. This button is also assembled in the same way as the embodiment already described.

Figure 14:
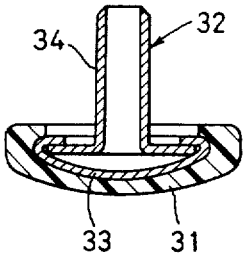

FIG. 14 is a third embodiment of the invention, in which 31 is a button head of thermoset polyester resin and 32 is a leg piece having an annular flange 35 and a tubular leg 34. The annular flange 35 is fixedly covered by a disc-shaped base 33 having a curved bottom face.

It should be obvious to those skilled in the art that numerous modifications and alterations of the embodiments so far described are possible without departing from the spirit and scope of the invention.

I claim:

1. An attaching button for attaching a fastener member to a fabric by the application of a mechanical force comprising:

a button head of rigid polyester resin with an outer surface and an internal cavity having an inlet and an internally expanded surface, and a metallic leg piece comprised of a generally hollow base and at least one leg, said base being generally circular in cross section and having an outer periphery at least slight larger in diameter than the inlet of the cavity, said base having a first surface shaped to complement the internal surface of said cavity and a second generally flat annular surface, said at least one leg extending outwardly from said second base surface [proximate the outer periphery thereof].

2. A button according to claim 1, wherein said cavity has a curved internal surface and said base has a complementary first surface.

3. A button according to claim 2, wherein said polyester resin is a thermoset polyester resin.

4. A button according to claim 3, wherein said button head has a design.

5. A button according to claim 2, wherein said disc-shaped base is an integral part of said leg piece.

6. A button according to claim 2, wherein said disc-shaped base is a separate but fixedly supported part.

7. A button according to claim 1, wherein said polyester resin is a thermoset polyester resin.

8. A button according to claim 7, wherein said button head has a design.

9. A button according to claim 1, wherein said disc-shaped base is an integral part of said leg piece.

10. A button according to claim 1, wherein said disc-shaped base is a separate but fixedly supported part.

*11. A button according to claim 1 wherein said at least one leg extends outwardly from said second base surface proximate the outer periphery thereof.*

*12. A button according to claim 1 wherein said second base surface has an inner periphery and said at least one leg extends outwardly from said second base surface proximate the inner periphery thereof.*

* * * * *